US012421999B2

(12) United States Patent
Hugelmann et al.

(10) Patent No.: US 12,421,999 B2
(45) Date of Patent: Sep. 23, 2025

(54) CONNECTION SYSTEM

(71) Applicant: SEW-EURODRIVE GMBH & CO. KG, Bruchsal (DE)

(72) Inventors: Martin Hugelmann, Graben-Neudorf (DE); Daniel Figuli, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 336 days.

(21) Appl. No.: 18/025,680

(22) PCT Filed: Sep. 7, 2021

(86) PCT No.: PCT/EP2021/074619
§ 371 (c)(1),
(2) Date: Mar. 10, 2023

(87) PCT Pub. No.: WO2022/058205
PCT Pub. Date: Mar. 24, 2022

(65) Prior Publication Data
US 2023/0358258 A1 Nov. 9, 2023

(30) Foreign Application Priority Data
Sep. 16, 2020 (DE) .......................... 102020005676.8

(51) Int. Cl.
*F16D 1/09* (2006.01)
(52) U.S. Cl.
CPC ........ *F16D 1/09* (2013.01); *F16D 2001/0903* (2013.01); *Y10T 403/7056* (2015.01); *Y10T 403/7058* (2015.01); *Y10T 403/7069* (2015.01)
(58) Field of Classification Search
CPC .......... F16B 7/02; F16B 7/025; F16C 35/063; F16C 35/0635; F16C 35/07; F16C 35/073;
(Continued)

(56) References Cited

U.S. PATENT DOCUMENTS

| 2,811,861 A | 11/1957 | Rieser |
| 5,496,127 A | 3/1996 | Mueller et al. |

(Continued)

FOREIGN PATENT DOCUMENTS

| DE | 4230941 A1 | 3/1994 |
| DE | 10060037 C1 | 1/2002 |

(Continued)

OTHER PUBLICATIONS

International Search Report issued in corresponding International Application No. PCT/EP2021/074619 dated Dec. 3, 2021, pp. 1-2, English Translation.

(Continued)

*Primary Examiner* — Josh Skroupa
(74) *Attorney, Agent, or Firm* — Carter, DeLuca & Farrell LLP

(57) ABSTRACT

A connection system includes a shaft, a hollow shaft, a press ring, a first ring fitted onto the hollow shaft, a second ring, a bearing, and a housing part. The hollow shaft is rotatably mounted via the bearing received in the housing part and has an inner conical region. The first ring has a first outer conical region and a second outer conical region. The first outer conical region is positioned against the inner conical region of the hollow shaft and/or at least a partial region of the first outer conical region is arranged radially between the shaft and the hollow shaft. The second ring encloses and/or surrounds the first ring. The press ring touches both a partial region of the radially outer surface of the hollow shaft and at least one partial region of the radially outer surface of the second ring and/or is mounted onto these partial regions.

24 Claims, 14 Drawing Sheets

(58) Field of Classification Search
CPC ...... F16C 35/077; F16C 2226/16; F16D 1/09; F16D 1/092; F16D 1/093; F16D 1/094; F16D 1/095; F16D 1/096; F16D 2001/0903; F16D 2001/0945; Y10T 403/7056; Y10T 403/7058; Y10T 403/7069
USPC ...................................... 403/370, 371, 374.4
See application file for complete search history.

(56) References Cited

U.S. PATENT DOCUMENTS

| | | | |
|---|---|---|---|
| 11,047,751 B2* | 6/2021 | Wang ...................... | F16D 1/095 |
| 2016/0252119 A1* | 9/2016 | Baciu ........................ | F16D 1/09 |
| | | | 403/344 |

FOREIGN PATENT DOCUMENTS

| | | | | |
|---|---|---|---|---|
| DE | 10312091 A1 * | 9/2004 | ............. | F16D 1/095 |
| DE | 10311917 A1 * | 10/2004 | ............. | F16D 1/095 |
| DE | 102007028873 A1 * | 12/2008 | ............. | F16D 1/095 |
| GB | 157937 A | 11/1921 | | |
| JP | 08247160 A * | 9/1996 | ............. | F16D 1/095 |

OTHER PUBLICATIONS

International Report on Patentability issued in corresponding International Application No. PCT/EP2021/074619, dated Mar. 21, 2023, pp. 1-8, English Translation.

* cited by examiner

CONNECTION SYSTEM

FIELD OF THE INVENTION

The present invention relates to a connection system, e.g., a shaft arrangement.

BACKGROUND INFORMATION

A clamp connection for securing a hollow shaft to a shaft is described in German Patent Document No. 42 30 941.

A connection system for a non-positive fit connection of a shaft to a hollow shaft is also described in German Patent Document No. 100 60 037.

SUMMARY

Example embodiments of the present invention provide for transmission of high torque.

According to an example embodiment of the present invention, a connection system, e.g., a shaft arrangement, includes a shaft, a hollow shaft, a press ring, a first ring fitted onto the hollow shaft, a second ring, a bearing, and a housing part. The hollow shaft is rotatably mounted via the bearing received in the housing part, and, for example, the shaft is inserted, at least in part, into the hollow shaft. The hollow shaft has an inner conical region, e.g., in which the radial wall thickness of the hollow shaft increases in the axial direction. The first ring has a first outer conical region and a second outer conical region, e.g., adjacent to the first outer conical region. The first outer conical region of the first ring is positioned against the inner conical region of the hollow shaft and/or at least a partial region of the first outer conical region of the first ring is arranged radially between shaft and hollow shaft. The second ring encloses and/or surrounds the first ring, and the press ring touches both a partial region of the radially outer surface of the hollow shaft and at least one partial region of the radially outer surface of the second ring and/or is mounted onto these partial regions.

Thus, the shrink disc applied by a shrink disc is divided between the hollow shaft and the second ring via the press ring. Both are underlaid by the first ring. Thus, torque is transmitted not only from the hollow shaft via the first ring into the solid shaft, but also from the hollow shaft via the press ring and the second ring to the first ring and from there to the shaft. Thus, in this manner, it is possible to transmit higher torque. This is because the torque is transmitted from the hollow shaft to the shaft via two torque transmission paths. A first path leads from the hollow shaft via the first ring to the shaft. A further path leads from the hollow shaft via the press ring and from there via the second ring to the first ring and from there to the shaft.

According to example embodiments, the second ring is fitted onto the first ring, and the second outer conical region of the first ring is positioned against an inner conical region of the second ring. Thus, when fitted on, the second ring comes to be positioned against the first ring without play and can be connected without play. When the first ring is fitted on, it thus is positioned tightly between the hollow shaft and the shaft. The first ring is, for example, arranged as a slit ring and is thus elastically deformable. For example, the second ring is also arranged as a slit ring.

According to example embodiments, the region covered in the axial direction by the first ring is included by the region covered in the axial direction by the shaft. Thus, the first ring is completely fitted onto the shaft.

According to example embodiments, the region covered in the axial direction by the first ring overlaps with the region covered in the axial direction by the hollow shaft. Thus, the first ring is partially inserted between hollow shaft and the shaft.

According to example embodiments, the first ring has a slit that is complete in the axial direction and in the radial direction. Thus, deformability is improved, e.g., when the first ring is shrunk onto the shaft.

According to example embodiments, the first ring has further slits, and the slits are spaced apart from one another circumferentially, e.g., regularly. For example, the further slits are incomplete either in the axial direction or in the radial direction. Thus, deformability is improved, e.g., when shrinking the first ring onto the shaft.

According to example embodiments, the radial distance region covered by the press ring is adjacent to the radial distance region covered by the partial region of the hollow shaft that covers an axial region that is also included by the axial region covered by the first ring. Thus, the press ring is seated directly on the hollow shaft, within which the first ring projects radially into the intermediate region between hollow shaft and shaft.

According to example embodiments, the second ring has a radially outwardly projecting collar region. Thus, disassembly is facilitated, since, when the screw of the shrink disk is unscrewed, the pressure rings are pressed apart from one another and therefore the radially projecting collar is carried along by the second pressure ring so that the second ring is pulled out, as well.

According to example embodiments, the first ring and second ring are arranged in one piece, e.g., integrally. Thus, assembly is improved.

According to example embodiments, the second ring has a female thread that screwed onto a male thread of the first ring. For example, the region covered in the axial direction by the male thread is adjacent to the region covered in the axial direction by the second conical region of the first ring, and, for example, the region covered in the axial direction by the male thread of the first ring is arranged on the side of the second conical region of the first ring facing away from the first conical region of the first ring. Thus, the second ring, when screwed onto the first ring, prestresses this first ring. Thus less air and improved force transmission are made possible.

According to example embodiments, a shrink disk has the press ring. Thus, the press ring can be shrunk onto the first ring and the hollow shaft by two pressure rings moved towards one another.

According to example embodiments, two pressure rings axially spaced apart from one another are fitted onto the press ring and each has inner conical regions fitted onto outer conical regions of the press ring such that the two pressure rings can be moved towards one another by axially oriented screws. The thread region of the screws are screwed into threaded holes of the first of the two pressure rings and project through holes in the second of the two pressure rings, so that the screw heads press against the second of the two pressure rings. Thus, a cost-effective shrink disc can be used that is wide enough, however, that it is seated not only on the hollow shaft, but also on the second ring. In this manner, two torque transmission paths can be effected; of these, the first torque transmission path goes from the hollow shaft to the shaft via the first ring, the second torque transmission path leads from the hollow shaft via the press ring of the shrink disc to the second ring and from there to the first ring.

According to example embodiments, the hollow shaft has, e.g., at its axial end region facing away from the conical region of the hollow shaft, a second inner conical region of the hollow shaft. A cone ring projects radially between this second inner conical region of the hollow shaft and the shaft. For example, a clamp ring is fitted onto the cone ring and connects the cone ring to the shaft in a non-positive fit. Thus, the hollow shaft can be spaced apart from the shaft and nevertheless can be centered coaxially. This is because the centering can be executed very precisely due to the axially bilateral conical support.

According to example embodiments, the shaft is spaced apart from the hollow shaft. Thus, tension can be avoided. In addition, corrosion caused by contact can be prevented.

According to example embodiments, the radial distance region covered by the nut overlaps with the radial distance region covered by the collar region, e.g., in an axial region that is not covered by the second pressure ring. Thus, axial removal can be executed.

According to example embodiments, the female thread region of a nut is screwed onto a male thread region of the first ring, and the second ring is connected to the nut in a positive fit. For example, a hook is formed on the second ring or the second ring has a hook that engages in an undercut on the nut. The radial distance region covered by the nut overlaps with the radial distance region covered by the second pressure ring, e.g., in an axial region that is not covered by the second pressure ring. For example, during disassembly, the axial region covered by the second pressure ring is adjacent to the axial region covered by the nut. Thus, the nut can be unscrewed for removal and in doing so the second ring can be pulled down by the first ring via the hook. The undercut is continuous and uninterrupted circumferentially, so that when the nut is screwed the engaged condition of the hook cannot be changed, e.g., even if the nut is turned under the hook.

Further features and aspects of example embodiments of the present invention are explained in greater detail below with reference to the appended schematic Figures.

DETAILED DESCRIPTION

Figure 1:
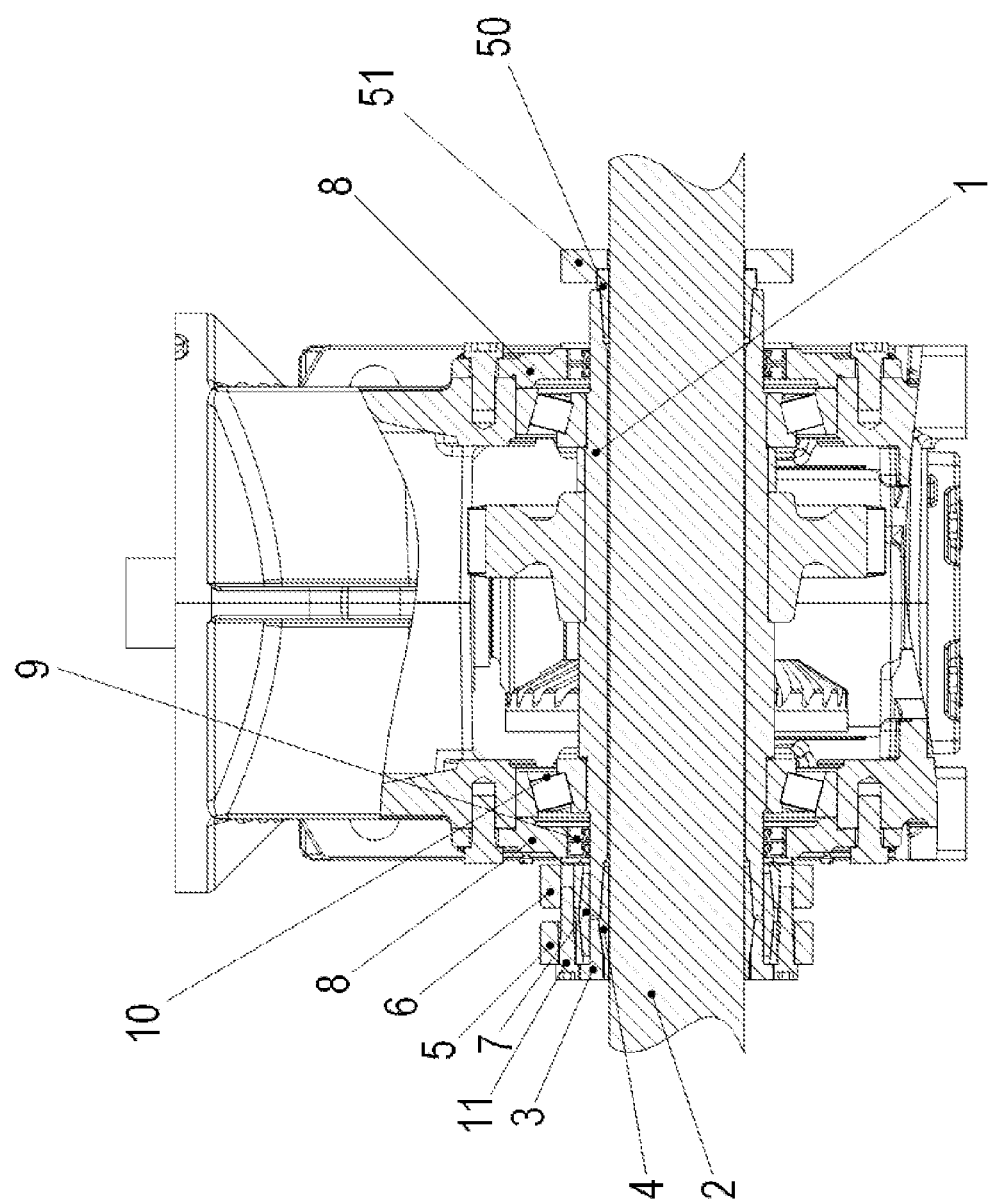
FIG. 1 is a cross-sectional view of a connection system in which a first ring 4 projects between a hollow shaft 1 to be connected to a shaft 2 and both the hollow shaft 1 and also a second ring 3 are pressed onto the first ring 4 via a press ring 7.

As illustrated in the Figures, the connection system has a hollow shaft 1, the first axial end region of which is rotatably mounted via a bearing 10 received in a housing part 8 of a gear box. In addition, a shaft sealing ring 9 is received on the housing part 8 so that the interior of the gearbox, at least partially filled with oil, is sealed against the surroundings.

The hollow shaft 1 is, for example, the output shaft of the gearbox and to this end is connected rotation-fast to a gear that is engaged with another toothed part.

The shaft 2 to be driven by the hollow shaft 1, e.g., a solid shaft, of a machine or system is inserted through the hollow shaft 1.

Figure 2:
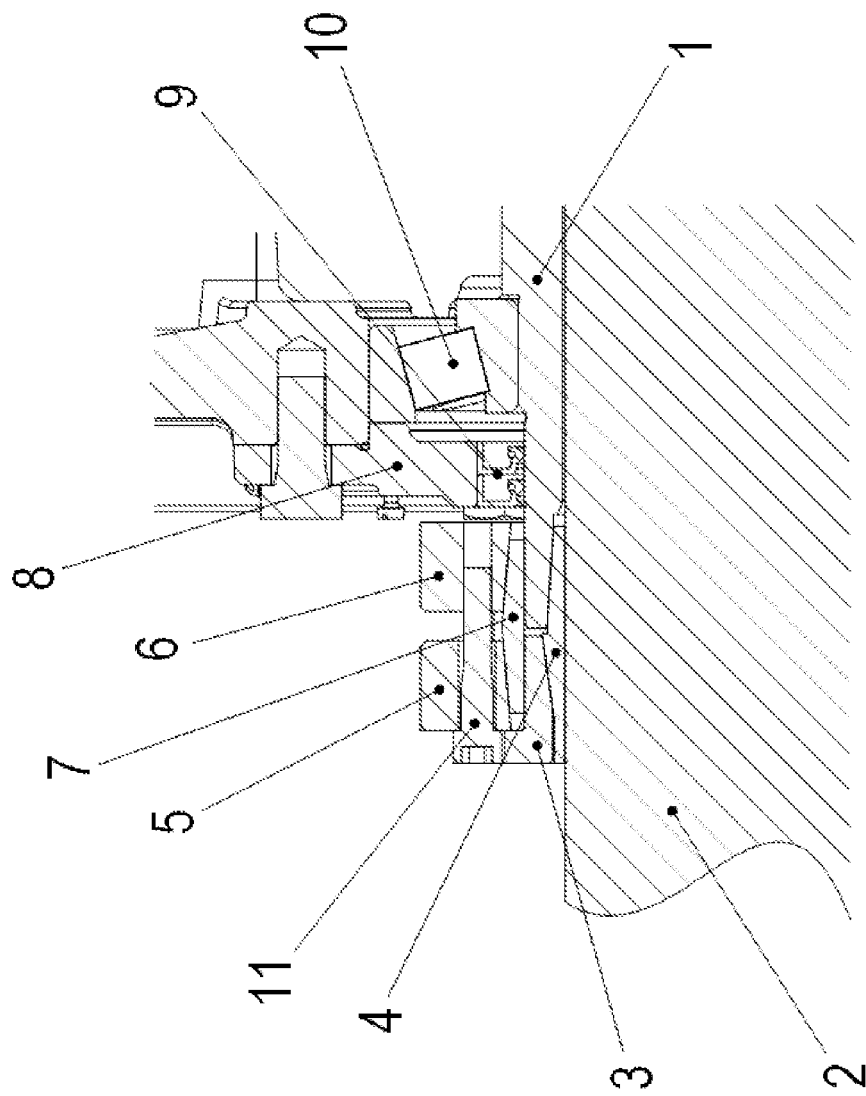
FIG. 2 is an enlarged view of a portion of FIG. 1.

As illustrated in FIGS. 1 and 2, for the non-positive fit connection between the hollow shaft 1 and the shaft 2, the first ring 4 is fitted onto the shaft 2 and inserted with a first conical region into a gap arranged between an inner conical region of the hollow shaft 1 and a cylindrical region of the shaft 2.

The wall thickness of the first conical region decreases as the distance to the bearing 10 decreases. On the side of the first conical region facing away from the bearing 10, the first conical region is adjacent to a second conical region, the wall thickness of which increases as distance to the bearing decreases.

The first ring 4 has axial slits at two or more circumferential positions, e.g., at least one of which axial slits is axially complete. In this manner, improved elastic deformability can be achieved.

Axially adjacent to the conical region the first ring 4 has a second conical region, the cone tip of which is arranged on the side of the first ring 4 facing away from the hollow shaft 1. The cone tip of the first conical region is arranged axially on the side of the first ring 4 facing the hollow shaft 1.

The second ring 3 is provided with a conical angle corresponding to the second conical region of the first ring 4.

The second ring 3 is arranged axially adjacent to the hollow shaft 1. For example, only a negligibly small gap is arranged between the hollow shaft 1 and the second ring 3.

The axial region covered by the first ring 4 overlaps both with the region covered in the axial direction by the hollow shaft 1 and with the region covered in the axial direction by the second ring 3.

The press ring 7 is fitted onto the hollow shaft 1 and the second ring 3 and has on its radial outer side two opposed conical regions. The cones of the two conical regions are thus oriented facing away from one another. A first pressure ring 5 is arranged on the first conical region of the press ring 7 and a second pressure ring 6 is arranged on the second conical region. Corresponding to the conical regions of the press ring 7, the two pressure rings 5, 6 have conical surfaces with which they touch the press ring 7.

Axially oriented screws 11 are guided through the first pressure ring 5 and are each at least partially screwed into a threaded hole in the pressure ring 6.

When the screws 11 are screwed into the threaded holes of the second pressure ring 6, the two pressure rings 5, 6 are moved towards one another and, thus, as a result of the conical surfaces, the press ring 7 is shrunk onto the hollow shaft 1 and the second ring 3.

The first ring 4 acts as a support ring and, thus, is arranged as a base for supporting the second ring 3 and the conical region of the hollow shaft 1.

The press ring 7 also has a first conical region, the wall thickness of which decreases as the distance to the bearing 10 decreases, and a conical region that is adjacent to this first conical region and the wall thickness of which increases as the distance to the bearing decreases. The first pressure ring 6 is fitted onto the first conical region of the press ring 7 and the second press ring 5 is fitted onto the second conical region of the press ring 7.

The press ring 7 and/or the first ring 4 are arranged as slitted rings.

Figure 9:
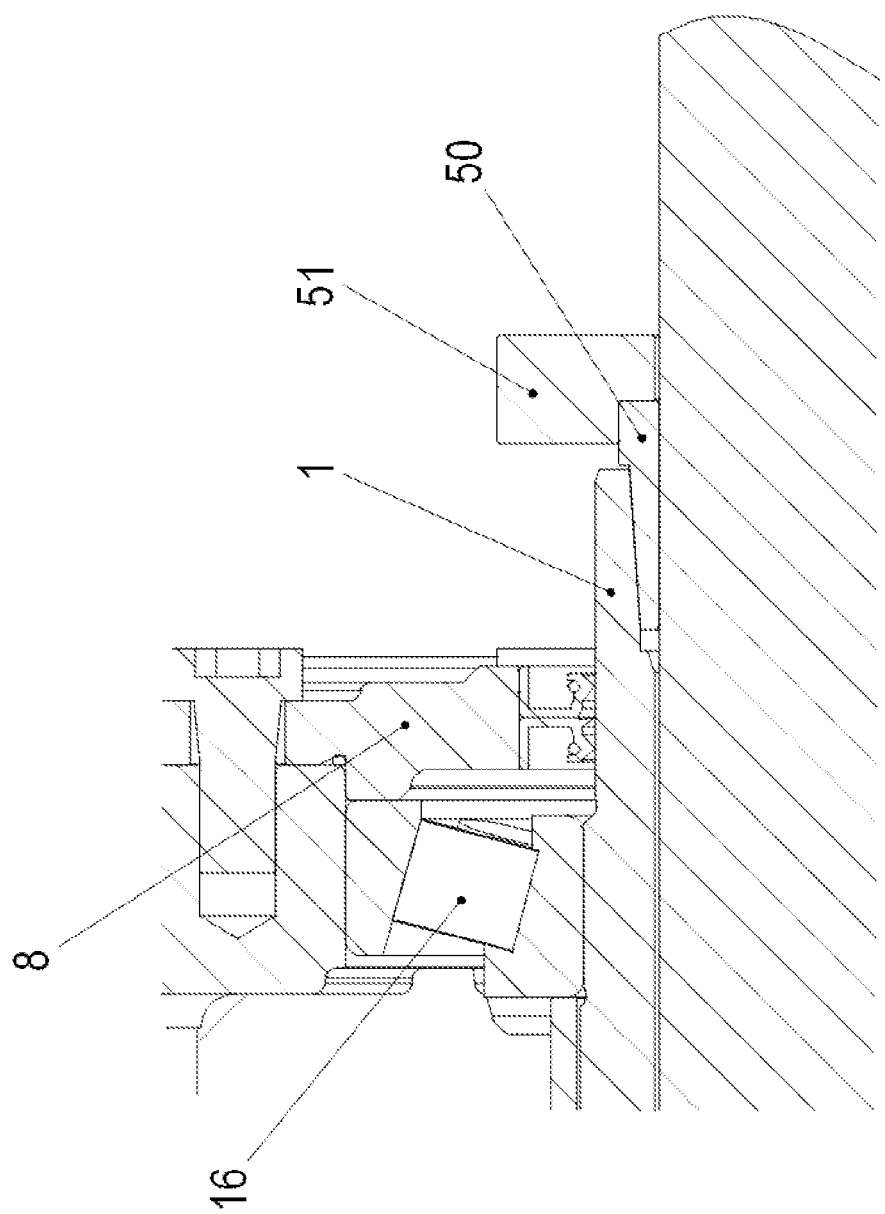
FIG. 9 illustrates the other end of the hollow shaft 1.
Figure 10:
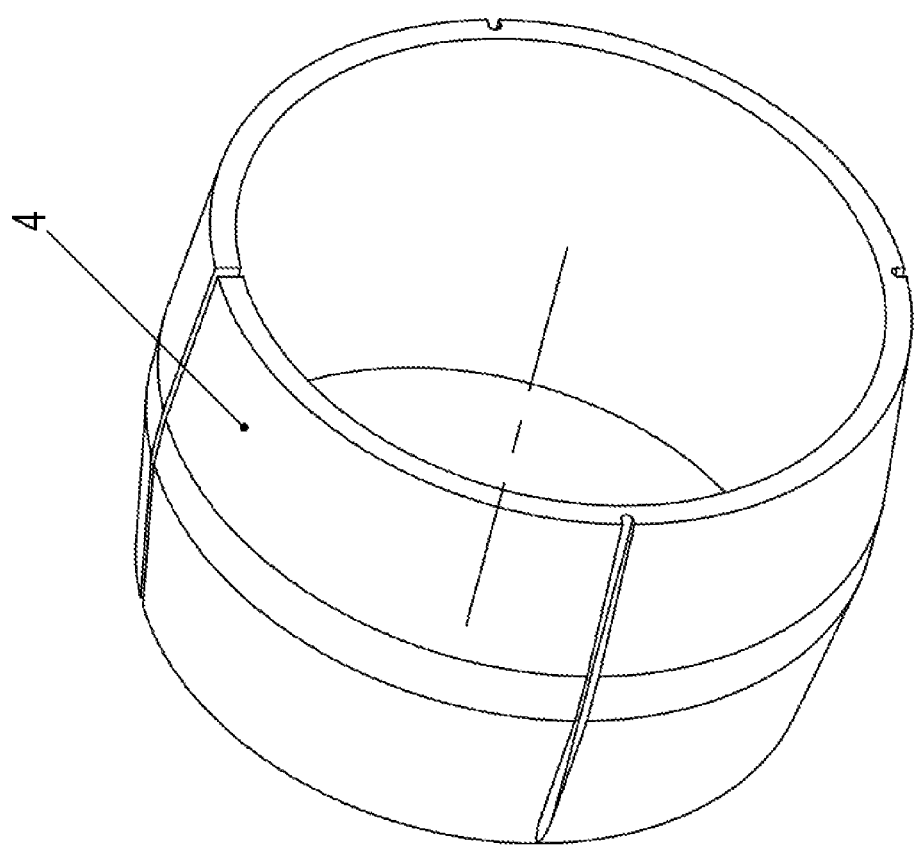
FIG. 10 is a e perspective view of the first ring 4, so that the three axial slits that are not complete radially and one radially complete axial slit can be seen.
Figure 11:
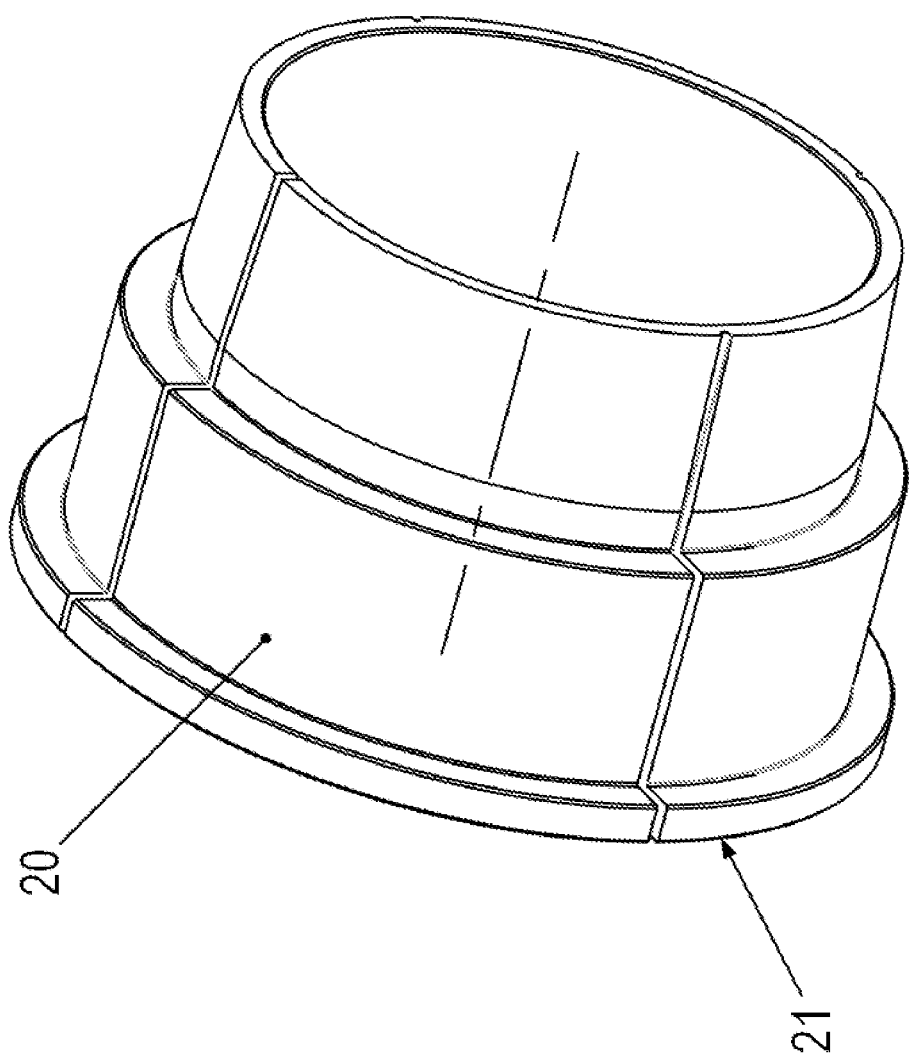
FIG. 11 is a perspective view of the first ring part 20.
Figure 12:
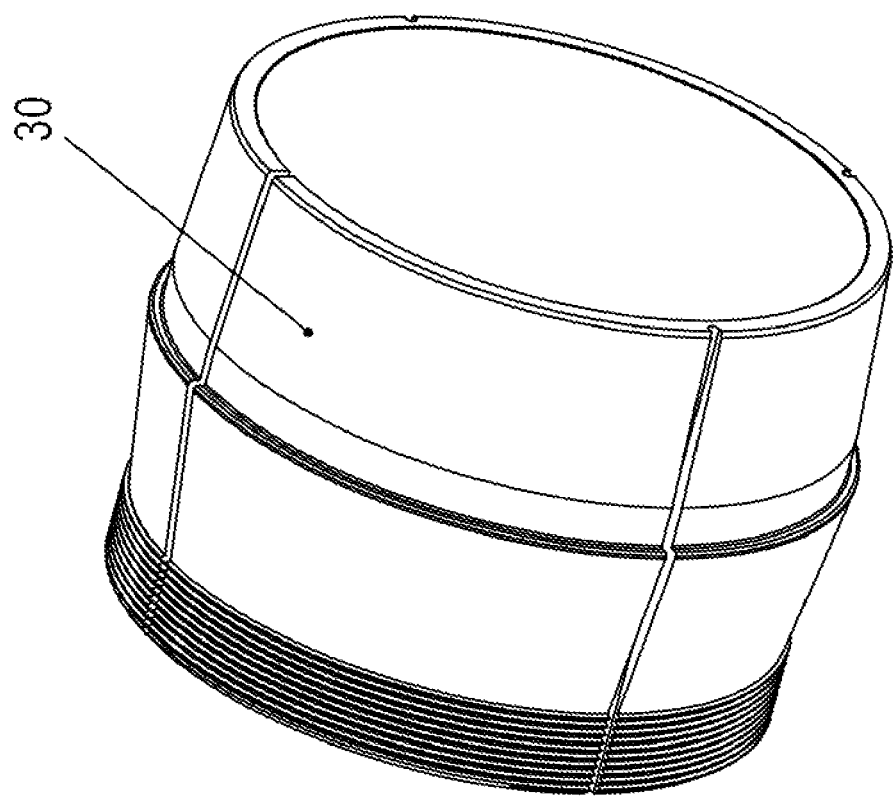
FIG. 12 is a perspective view of the first ring 30.
Figure 13:
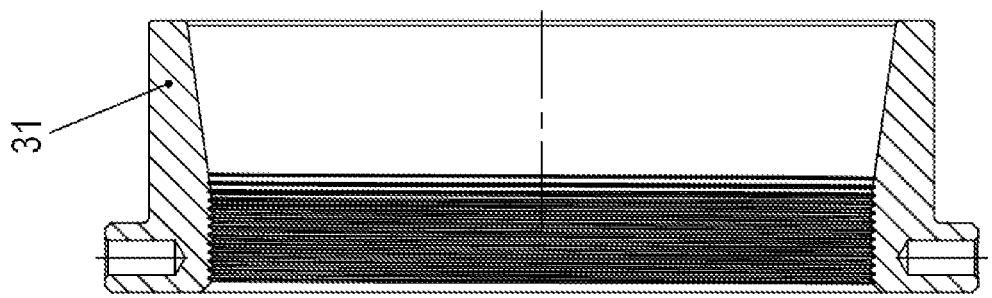
FIG. 13 is a cross-sectional view through a second ring 31.
Figure 14:
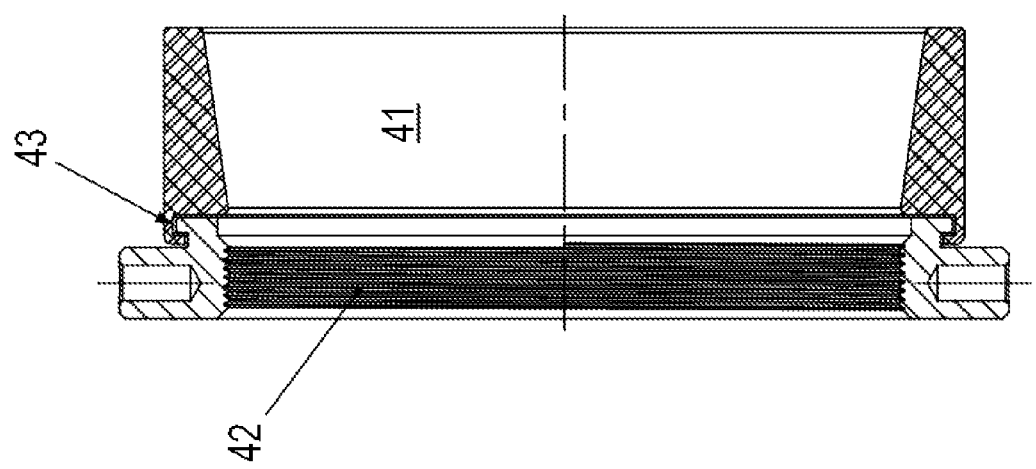
FIG. 14 is a cross-sectional view through the second ring 41 with nut 42.

As illustrated in FIG. 9, the other axial end region of the hollow shaft 1 is rotatably mounted via a second bearing 16 received in the housing part 8 and is also sealed against the surroundings via a second shaft sealing ring received in the housing part 8.

The other end of the hollow shaft 1 also has a projecting conical region, in which, again, a gap in which a cone ring 50 is inserted is present between this conical region and the shaft. This cone ring 50 is shrunk onto the hollow shaft 1 by a clamping ring 51 that is clamped using a, e.g., tangentially oriented clamping screw. To this end, the clamping ring 51 encloses the cone ring 50 radially.

The cone ring 50 thus contributes to centering the hollow shaft 1 relative to the shaft 2.

A higher torque can be transmitted through the second ring 3. This is because since the two pressure rings 5 and 6 are moved towards one another, on the one hand the press ring 7 is pressed towards the hollow shaft 1, so that torque flows from the hollow shaft 1 via the first ring 4 to the shaft 2. On the other hand, torque also flows via the press ring 7 to the second ring 3 and from there via the first ring 4 into the shaft 2.

For the connection, that is, for passing on the torque from the hollow shaft 1 to the shaft 2, the connection system requires, on the side of the shaft sealing ring 9 facing away from the bearing 10, only the region covered in the axial direction, that is in the direction of the rotational axis of the hollow shaft 1 and/or the shaft 2. The other end region of the hollow shaft 1 illustrated in FIG. 9 does not contribute to transmitting the torque, or contributes only insignificantly, even if the cone ring 50 clamped to the shaft 2 with the clamping ring 51 there is inserted between the hollow shaft 1 and the shaft 2.

Figure 3:
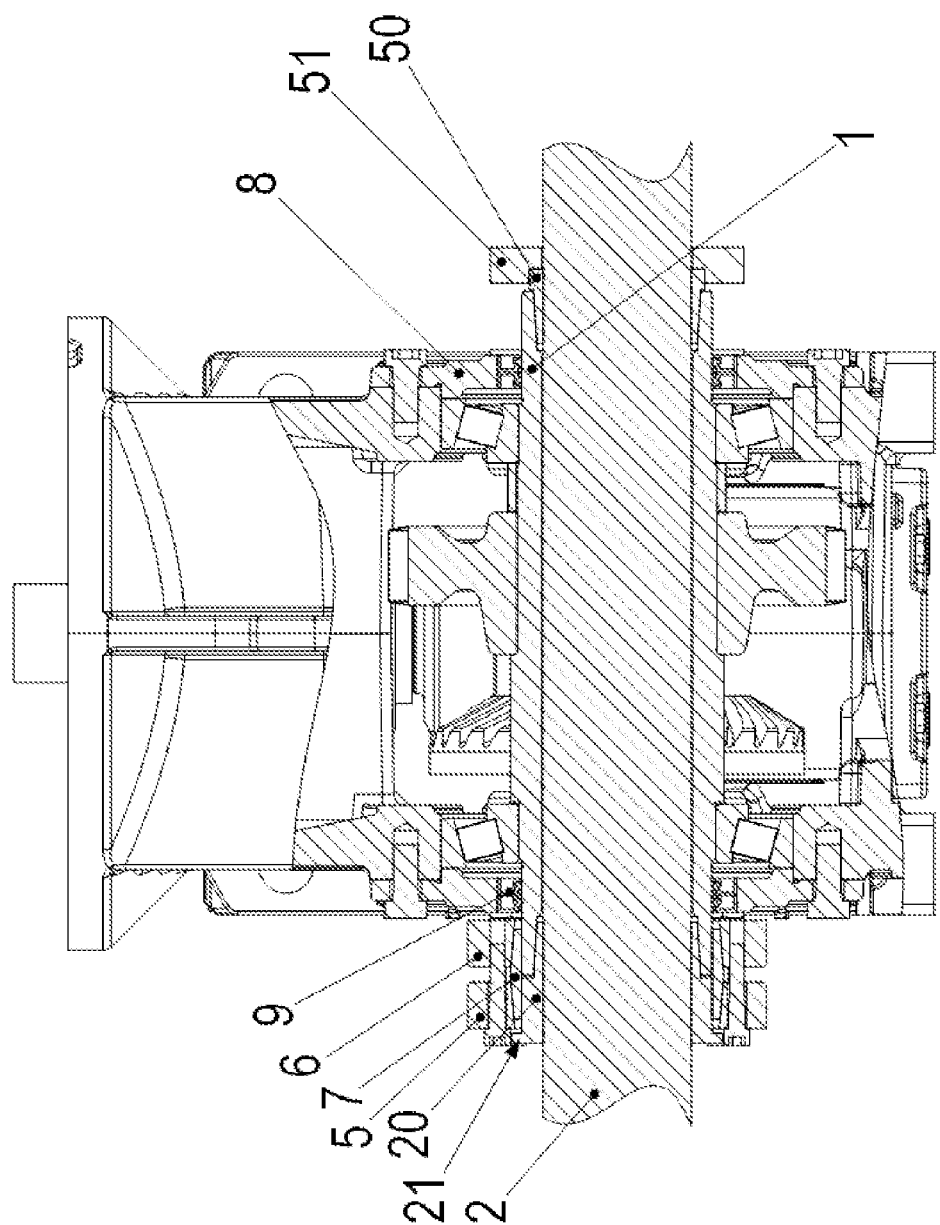
FIG. 3 illustrates a connection system in which a first ring part 20 is used, instead of the first ring 4 and the second ring 3, and has a radially projecting collar 21.

The hollow shaft 1 is spaced apart from the shaft 2 in the region between the end region, as illustrated in FIG. 3, and the other end region, as illustrated in FIG. 9.

Figure 4:
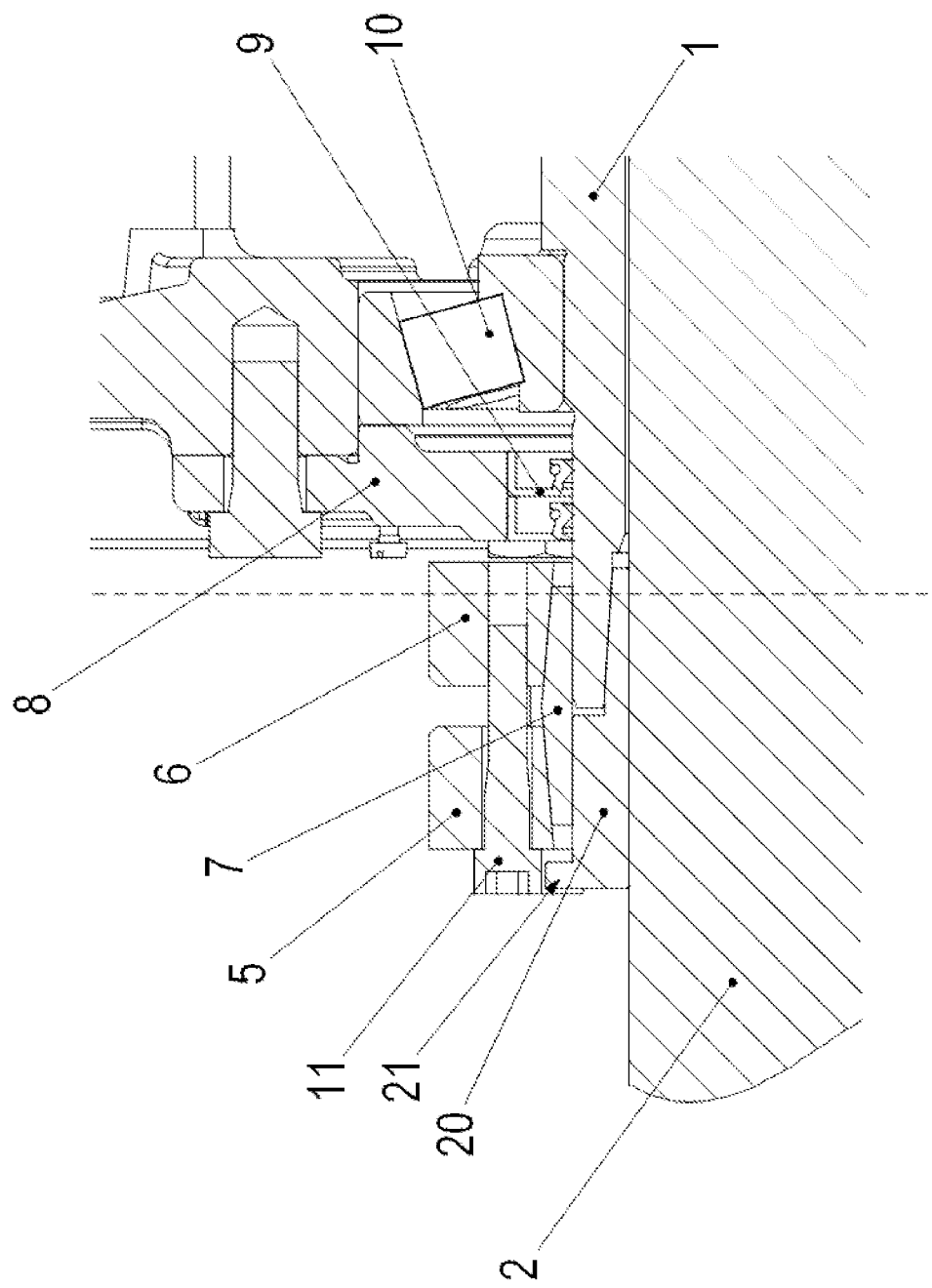
FIG. 4 is an enlarged view of a portion of FIG. 3.
Figure 5:
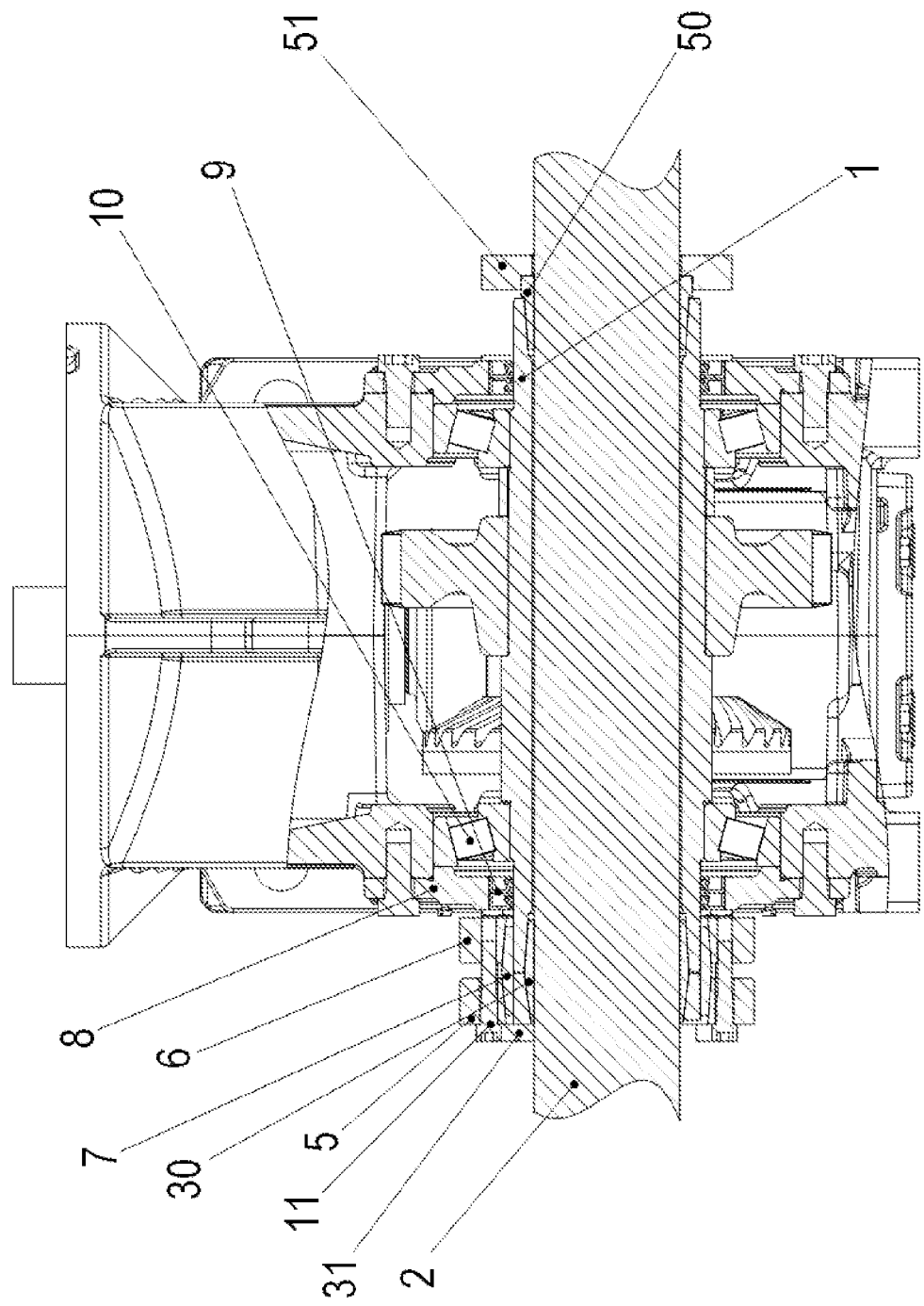
FIG. 5 illustrates a connection system in which the first ring 30 is connected to the second ring 3 in a screw connection and has a radially projecting collar.

As illustrated in FIGS. 3 and 4, instead of the first ring 4 and the second ring 3, as illustrated in FIG. 1, a single ring part 20 can be employed, the outer conical region of which is inserted between the inner conical region of the hollow shaft 1 and the shaft 2, so that the shaft 2 is centered relative to the hollow shaft 1, as illustrated in FIG. 1 and coaxial with the hollow shaft 1.

As illustrated in FIG. 1, as well, in the exemplary embodiment illustrated in FIG. 3, when the screw 11 is screwed into the threaded hole of the second pressure ring 6, the first pressure ring 5 is pressed towards the second pressure ring 6 by the screw head of the screw 11, so that the press ring 7 is pressed both directly onto the hollow shaft 1 and also onto the first ring part 20 by the opposing conically shaped inner surfaces of the two pressure rings 5, 6.

In addition, at its end region facing axially away from the conical region of the first ring part 20, the first ring part 20 has a collar 21 that projects radially outward and that extends completely circumferentially. This collar 21 permits simple disassembly in that when the two pressure rings 5 and 6 are moved away from one another, the first pressure ring 5 presses on the collar of the ring part 20 and thus pulls the ring part 20 axially out under the press ring 7.

Figure 6:
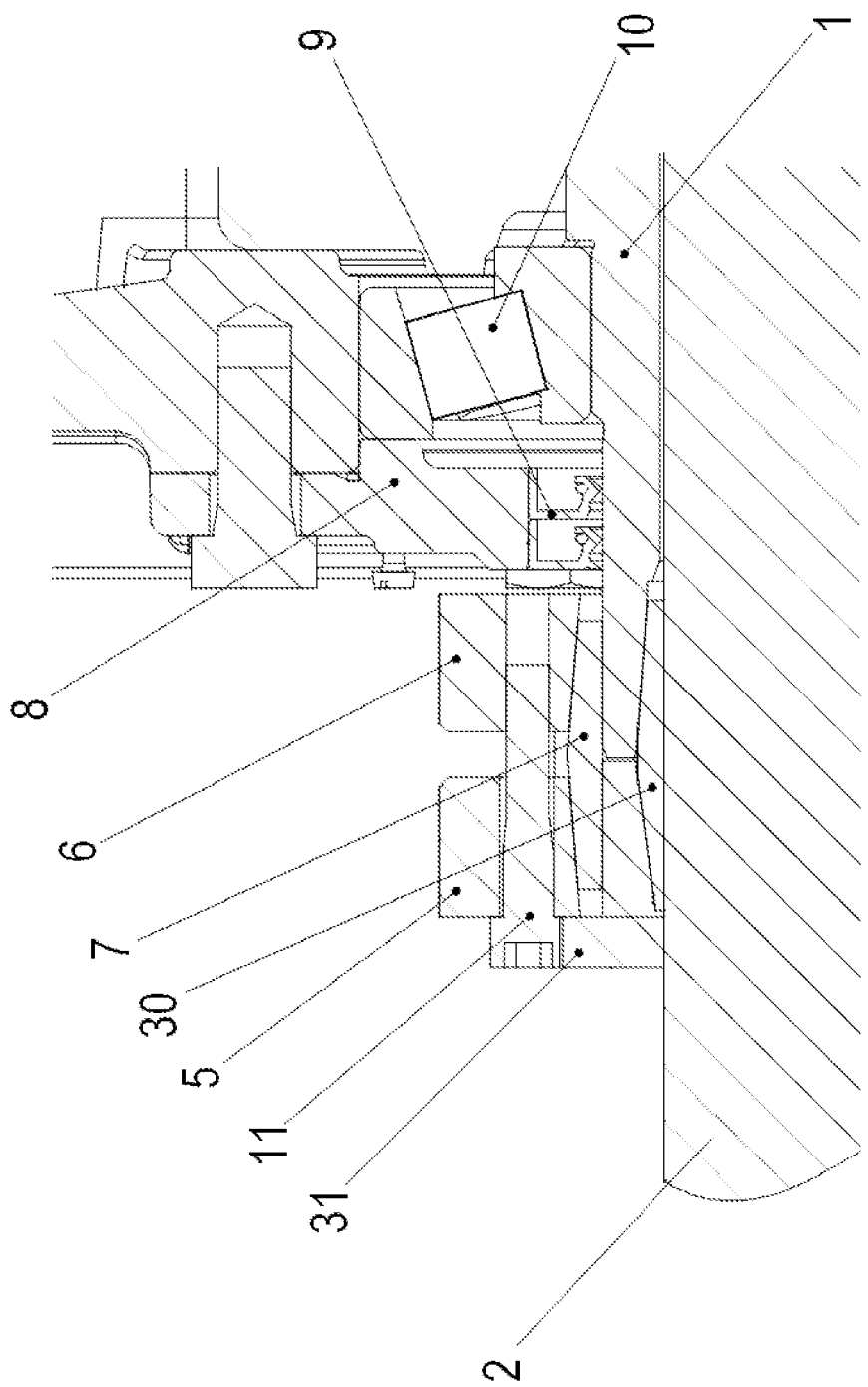
FIG. 6 is an enlarged view of a portion of FIG. 5.
Figure 7:
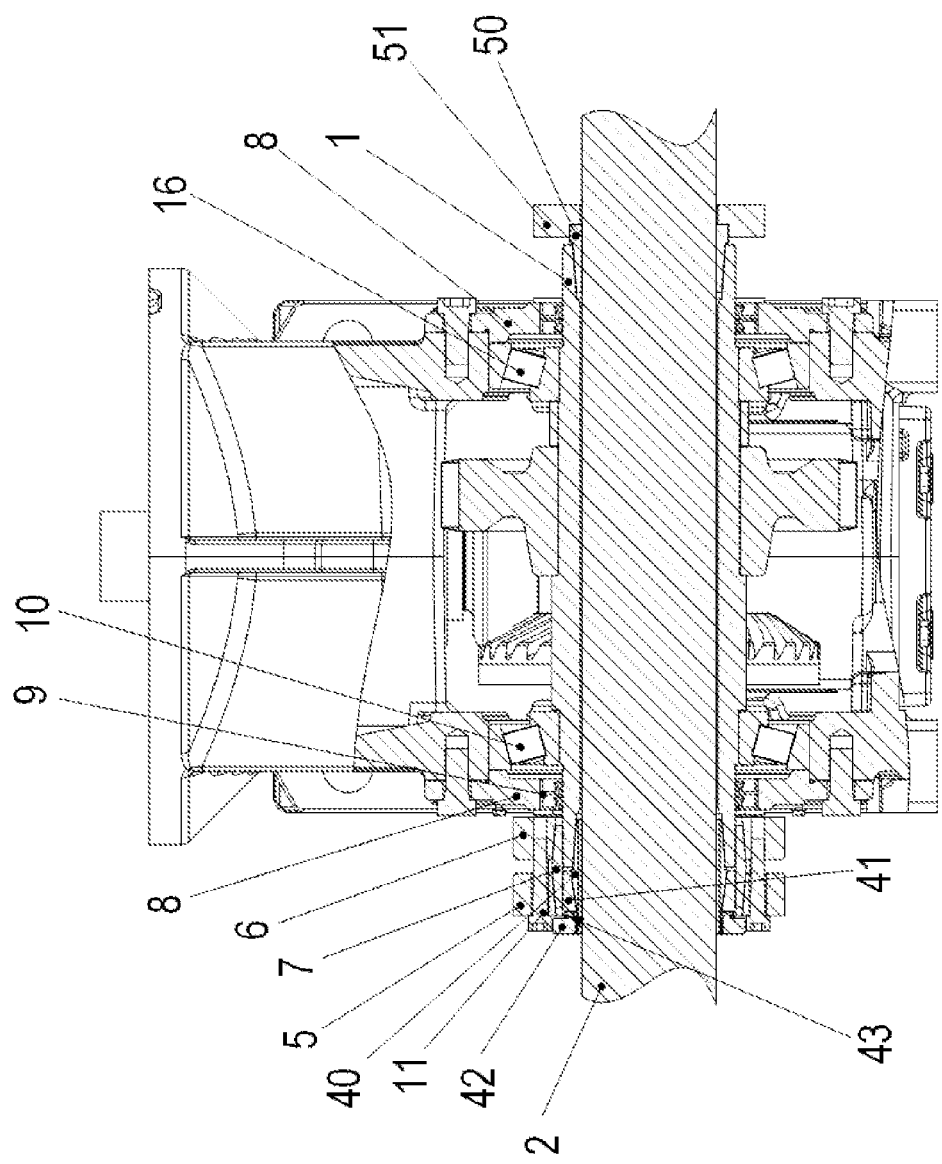
FIG. 7 illustrates a connection system in which a nut 42 secured with a hook 43 to the second ring 41 presses the second ring 41 towards the hollow shaft 1 and thus the first ring 40 is shrunk onto the shaft 2.

As illustrated in FIG. 6, a second ring 31 screwed onto a first ring 30 can be employed instead of the second ring part 20 in the example embodiment illustrated in FIG. 3. The second ring 31 has a female thread that can be screwed onto a matching male thread of the first ring 30. Thus, when the second ring 31 is being screwed onto the first ring 30, the second ring 31 can be screwed onto the first ring 30 until the inner conical region of the second ring 31 is positioned against the outer conical region of the first ring 30, e.g., since their conical angles are equal.

The second ring 31 has a collar that projects radially outward and extends completely circumferentially.

The first ring 30 is provided with slits. To this end, the first ring has at multiple positions on its circumference an axially oriented slit that is arranged complete either radially or axially. For example, a single one of the slits is arranged complete axially and/or radially. Increased elasticity is achieved in this manner.

That is, a plurality of the slits are, for example, not complete radially or axially, while a single further slit is complete radially and axially.

The press ring 7 can also alternatively or additionally be arranged as such a slitted ring.

Figure 8:
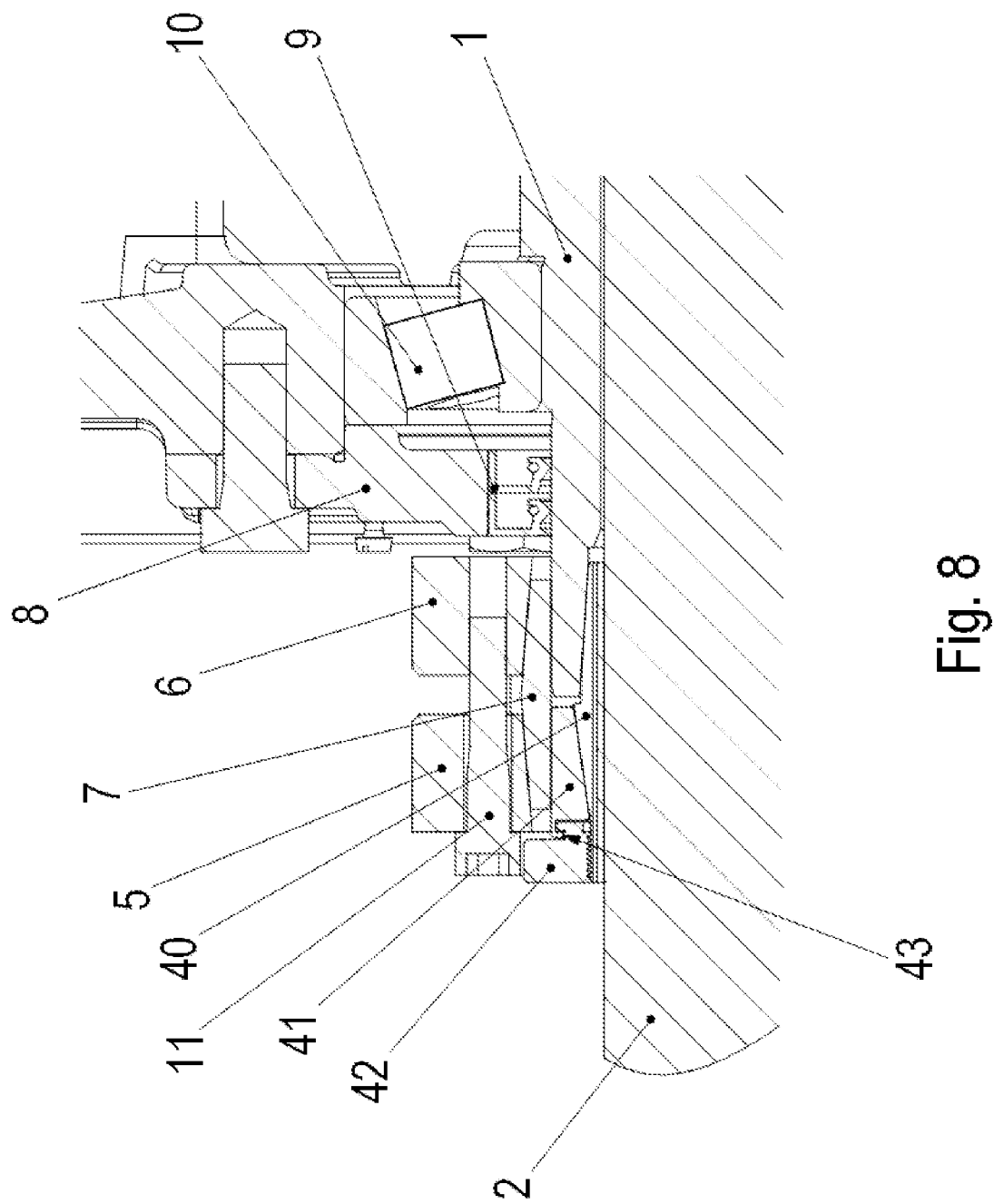
FIG. 8 is an enlarged view of a portion of FIG. 7.

As illustrated in FIG. 8, a second ring 41 can be shrunk onto the first ring 40 by the press ring 7.

In addition, an axially projecting hook 43 is formed on the second ring 41, e.g., in one piece, that is, integrally. The female thread of a nut 42 is screwed onto a male thread of a first ring 40 on the side of the second ring 41 facing axially away from the hollow shaft 1.

The hook 43 engages in a depression, e.g., an undercut, of the second ring 41. The hook 43 is, for example, hooked into the depression.

Thus, during disassembly, the nut 42, that is, when the nut 42 is screwed off, e.g., in which the nut 42 moves increasingly farther from the hollow shaft 1, makes it possible for the nut 42 to remove the second ring 41 from the intermediate space between the press ring 7 and the first ring 40 by the hook 43.

For this, the first ring has a male thread region that connects to the hollow shaft 1 at a first conical region, e.g., in which the wall thickness increases as distance to the hollow shaft 1 decreases. A further conical region in which the wall thickness decreases as distance to the hollow shaft 1 decreases connects to this conical region.

The axial direction is parallel to the direction of the rotational axis of the hollow shaft 1 and/or shaft 2. The radial direction relates to the rotational axis of the hollow shaft 1, as does the circumferential direction.

Covered in the axial direction should also be understood alternatively or additionally as axially covered

LIST OF REFERENCE NUMERALS

1 Hollow shaft
2 Shaft, e.g., solid shaft
3 Second ring
4 First ring
5 First pressure ring
6 Second pressure ring
7 Press ring
8 Housing part 9 Shaft sealing ring
10 Bearing for hollow shaft 1
11 Screw
20 First ring part
21 Circumferential collar, projecting radially outward, of the first ring part 20
30 First ring
31 Second ring
40 First ring
41 Second ring
42 Nut
43 Hook
50 Cone ring
51 Clamping ring with clamping screw

The invention claimed is:

1. A connection system, comprising:
a housing part;
a bearing received in the housing part;
a shaft;
a hollow shaft rotatably mounted via the bearing and including an inner conical region;
a first ring fitted onto the hollow shaft and including a first outer conical region and a second outer conical region, the first outer conical region of the first ring being positioned against the inner conical region of the hollow shaft and/or at least a partial region of the first outer conical region of the first ring being arranged radially between the shaft and the hollow shaft;
a second ring enclosing and/or surrounding the first ring; and
a press ring touching both a partial region of a radially outer surface of the hollow shaft and at least one partial region of a radially outer surface of the second ring and/or being mounted onto the partial regions.

2. The connection system according to claim 1, wherein the shaft is at least partially arranged in the hollow shaft, a radial wall thickness of the hollow shaft increasing in an axial direction in the inner conical region of the hollow shaft, the first outer conical region of the first ring being adjacent the second outer conical region of the first ring.

3. The connection system according to claim 1, wherein the second ring is arranged on the first ring, and the second outer conical region of the first ring is positioned against an inner conical region of the second ring.

4. The connection system according to claim 1, wherein a region covered in an axial direction by the first ring is included by a region covered in the axial direction by the shaft.

5. The connection system according to claim 1, wherein a region covered in an axial direction by the first ring overlaps with a region covered in the axial direction by the hollow shaft.

6. The connection system according to claim 1, wherein the first ring includes a complete slit in an axial direction and in an radial direction.

7. The connection system according to claim 6, wherein the first ring includes further slits spaced apart and/or regularly spaced apart from one another circumferentially, the further slits being incomplete in the axial direction and/or in the radial direction.

8. The connection system according to claim 1, wherein the first ring includes slits.

9. The connection system according to claim 8, wherein the slits are spaced apart and/or regularly spaced apart from one another circumferentially.

10. The connection system according to claim 8, wherein the slits are incomplete in an axial direction and/or in a radial direction.

11. The connection system according to claim 1, wherein a radial distance region covered by the press ring is adjacent to a radial distance region covered by a partial region of the hollow shaft that covers an axial region that is also included by an axial region covered by the first ring.

12. The connection system according to claim 1, wherein the second ring includes a radially outward projecting collar region.

13. The connection system according to claim 1, wherein the first ring and second ring are arranged in one piece and/or integrally.

14. The connection system according to claim 1, wherein the second ring includes a female thread engaged with a male thread of the first ring.

15. The connection system according to claim 14, wherein a region covered in an axial direction by the male thread is adjacent to a region covered in the axial direction by the second outer conical region of the first ring.

16. The connection system according to claim 15, wherein the region covered in the axial direction by the male thread of the first ring is arranged on a side of the second outer conical region of the first ring facing away from the first outer conical region of the first ring.

17. The connection system according to claim 1, wherein a shrink disk includes the press ring.

18. The connection system according to claim 1, wherein two pressure rings axially spaced apart from one another are arranged on the press ring and each pressure ring includes inner conical regions arranged on outer conical regions of the press ring, the two pressure rings being movable toward one another by axially oriented screws, a thread region of the screws engaging threaded holes of a first one of the two pressure rings and project through holes in a second one of the two pressure rings, screw heads of the screws pressing against the second one of the two pressure rings.

19. The connection system according to claim 1, wherein the hollow shaft includes a second inner conical region, a cone ring projecting radially between the second inner conical region of the hollow shaft and the shaft.

20. The connection system according to claim 19, wherein the second inner conical region of the hollow shaft is located at an axial end region of the hollow shaft facing away from the inner conical region of the hollow shaft, a clamp ring arranged on the cone ring and non-positively connecting the cone ring to the shaft.

21. The connection system according to claim 1, wherein the shaft is spaced apart from the hollow shaft.

22. The connection system according to claim 1, wherein a radial distance region covered by a nut overlaps with a radial distance region covered by a collar region in an axial region that is not covered by a second pressure ring.

23. The connection system according to claim 1, wherein a female thread region of a nut engages a male thread region of the first ring, the second ring is connected to the nut in a positive fit, a radial distance region covered by the nut overlapping with a radial distance region covered by a second pressure ring.

24. The connection system according to claim 23, wherein the second ring includes a hook that engages in an undercut on the nut, the radial distance region covered by the nut overlapping with the radial distance region covered by the second pressure ring in an axial region that is not covered by the second pressure ring, and during disassembly, the axial region covered by the second pressure ring is adjacent to an axial region covered by the nut.

\* \* \* \* \*